United States Patent
Tasaki et al.

(10) Patent No.: US 9,810,454 B2
(45) Date of Patent: Nov. 7, 2017

(54) MAGNETIC STRUCTURE AND MAGNETIC AIR-CONDITIONING AND HEATING DEVICE USING SAME

(75) Inventors: Yutaka Tasaki, Yokohama (JP); Hidekazu Takahashi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 315 days.

(21) Appl. No.: 14/344,081

(22) PCT Filed: Sep. 7, 2012

(86) PCT No.: PCT/JP2012/072861
§ 371 (c)(1),
(2), (4) Date: Mar. 11, 2014

(87) PCT Pub. No.: WO2013/038996
PCT Pub. Date: Mar. 21, 2013

(65) Prior Publication Data
US 2014/0338365 A1 Nov. 20, 2014

(30) Foreign Application Priority Data

| | | |
|---|---|---|
| Sep. 14, 2011 | (JP) | 2011-201093 |
| Jun. 26, 2012 | (JP) | 2012-143425 |
| Aug. 2, 2012 | (JP) | 2012-172154 |

(51) Int. Cl.
*F25B 21/00* (2006.01)
*H01F 1/01* (2006.01)

(52) U.S. Cl.
CPC ........ *F25B 21/00* (2013.01); *F25B 2321/002* (2013.01); *H01F 1/012* (2013.01); *Y02B 30/66* (2013.01)

(58) Field of Classification Search
CPC ......... Y02B 30/66; H01F 1/012; H01F 1/017; F25B 2321/002; F25B 21/00
(Continued)

(56) References Cited

U.S. PATENT DOCUMENTS 7,552,592 B2 6/2009 Iwasaki et al.
2005/0241134 A1 11/2005 Lu
(Continued)

FOREIGN PATENT DOCUMENTS

JP 59219670 A 12/1984
JP 2007147209 A 6/2007
(Continued)

*Primary Examiner* — Len Tran
*Assistant Examiner* — Ana Vazquez
(74) *Attorney, Agent, or Firm* — Young Basile Hanlon & MacFarlane, P.C.

(57) ABSTRACT

A magnetic structure has a magnetocaloric material the temperature of which changes with application or removal of a magnetic field, and a high thermal conduction member which is in contact with the magnetocaloric material and has higher thermal conductivity than the magnetocaloric material. Further, this magnetic air-conditioning and heating device is provided with multiple of the aforementioned magnetic structures, a thermal switch which is arranged between magnetic structures and transmits or insulates heat, and a magnetic field varying unit which applies or removes a magnetic field to each of the magnetic structures. By providing in the magnetic structures a high thermal conduction member with higher thermal conductivity than the magnetocaloric material, some or all of the heat generated in the magnetocaloric material can be quickly conducted in the magnetic bodies.

5 Claims, 10 Drawing Sheets

(58) Field of Classification Search
USPC .............................................. 62/3.1; 165/185
See application file for complete search history.

(56) References Cited

U.S. PATENT DOCUMENTS

| | | |
|---|---|---|
| 2008/0078184 A1 | 4/2008 | Saito et al. |
| 2009/0019859 A1 | 1/2009 | Shin et al. |
| 2010/0037625 A1 | 2/2010 | Katter |
| 2010/0116471 A1 | 5/2010 | Reppel et al. |
| 2011/0048031 A1* | 3/2011 | Barve ................ F25B 21/00 62/3.1 |
| 2011/0048690 A1 | 3/2011 | Reppel et al. |
| 2011/0062373 A1 | 3/2011 | Chang et al. |
| 2011/0154832 A1* | 6/2011 | Barve ................ F28D 17/02 62/3.1 |
| 2011/0192833 A1* | 8/2011 | Muller ............... F25B 21/00 219/618 |
| 2011/0302931 A1* | 12/2011 | Sohn ................. F25D 19/006 62/3.1 |
| 2012/0031108 A1* | 2/2012 | Kobayashi .......... F25B 21/00 62/3.1 |

FOREIGN PATENT DOCUMENTS

| | | |
|---|---|---|
| JP | 2008051412 A | 3/2008 |
| JP | 2008082662 A | 4/2008 |
| JP | 2009520946 A | 5/2009 |
| JP | 2010516042 A | 5/2010 |
| JP | 2010525291 A | 7/2010 |
| JP | 2010531968 A | 9/2010 |

\* cited by examiner

MAGNETIC STRUCTURE AND MAGNETIC AIR-CONDITIONING AND HEATING DEVICE USING SAME

CROSS REFERENCE TO RELATED APPLICATION

The present application claims priority to Japanese Patent Application Nos. 2011-201093, filed Sep. 14, 2011; 2012-143425, filed Jun. 26, 2012; and 2012-172154, filed Aug. 2, 2012, each incorporated herein in its entirety.

TECHNICAL FIELD

The present invention relates to a magnetic structure and a magnetic heating and cooling apparatus using the same. More particularly, the present invention relates to a magnetic structure having improved heat conductivity and a magnetic heating and cooling apparatus using the same.

BACKGROUND

In general, heating and cooling apparatuses use a vapor compression system. The vapor compression system uses a gas medium such as chlorofluorocarbon and alternative chlorofluorocarbon to repeatedly exhaust heat by compressing the gas medium and absorb heat by expanding the gas medium, thereby producing heating and cooling effects. However, massive energy may be required at the compressing step, and the coefficient of performance (COP) can be as low as approximately 1.5. In addition, associated environmental problems are being pointed out because of the use of chlorofluorocarbon and alternative chlorofluorocarbon in the vapor compressing system.

In this context, in recent years, a technology for a magnetic refrigeration system is receiving increased attention as an alternative to the vapor compression system. The magnetic refrigeration system uses a magnetic material that exhibits a magnetocaloric effect. The magnetocaloric effect is a phenomenon in which, when a magnetic field environment changes because of application and removal of a magnetic field, the temperature of the magnetic material itself changes in association with the change of the magnetic field environment. In particular, the magnetic refrigeration system uses the magnetocaloric effect of the magnetic material to repeatedly exhaust heat by application (removal) of the magnetic field and absorb heat by removal (application) of the magnetic field, thereby producing heating and cooling effects. The magnetic refrigeration system has the advantage of having a COP of approximately 3 to 4 higher than that of the vapor compression system so as to ensure higher energy efficiency and is an environmentally-friendly system since chlorofluorocarbon or alternative chlorofluorocarbon is not used.

For example, Japanese Patent Unexamined Publication No. 2007-147209 discloses a magnetic refrigerator using a magnetic refrigeration system. In particular, the magnetic refrigerator includes a magnetic block including plural positive magnetic materials and negative magnetic materials which are alternately arranged, a magnetic field increasing-decreasing unit, and a heat switch. The positive magnetic materials produce heat when the magnetic field is applied and absorb heat when the magnetic field is removed. The negative magnetic materials absorb heat when the magnetic field is applied and produce heat when the magnetic field is removed. Hereinafter, a specific example of a system that achieves refrigerating effects (heating effects) according to the method described in Japanese Patent Unexamined Publication No. 2007-147209 will be explained.

First, a block is conceived to include magnetic materials having a configuration in which a negative magnetic material A, a positive magnetic material B, a negative magnetic material C and a positive magnetic material D are arranged in this order. The temperature change of the positive magnetic materials and the negative magnetic materials due to application and removal of the magnetic field is 5 degrees, and the initial temperature of the respective magnetic materials is supposed to be 25° C. When the magnetic field increasing-decreasing unit applies the magnetic field, the temperatures of the negative magnetic materials A and C decrease, and the temperatures of the positive magnetic materials B and D increase. Namely, the temperatures of A and C are 20° C., and the temperatures of B and D are 30° C. As a result, a temperature gradient is generated between the positive magnetic materials and the negative magnetic materials adjacent to each other.

Next, a heat switch is inserted between B and C. The heat is transmitted from B to C via the heat switch so that the temperature gradient between B and C disappears. On the other hand, the temperatures of A and D, which are not connected to other magnetic materials via the heat switch, are maintained by way of the heat insulation effect of an air layer. Namely, A is 20° C., B and C are 25° C., and D is 30° C. Subsequently, the heat switch between B and C is removed and the magnetic field is then removed by the magnetic field increasing-decreasing unit. The removal of the magnetic field increases the temperatures of the negative magnetic segments A and C and decreases the temperatures of the positive magnetic segments B and D. Namely, A is 25° C., B is 20° C., C is 30° C., and D is 25° C. Subsequently, the heat switches are inserted between A and B and between C and D. The heat is then transmitted between the magnetic materials connected via the heat switches so that the temperature gradients disappear. Namely, A and B are 22.5° C., and C and D are 27.5° C. Here, heat conduction between B and C does not occur because of the heat insulation effect of the air layer. As described above, by repeating the process including the steps of applying the magnetic field, inserting the heat switch, removing the magnetic field, and removing the heat switch, the temperature of A decreases and the temperature of D increases so that the temperature gradient between A and D increases. Accordingly, a cooling effect is obtained from A and a heating effect is obtained from D.

Here, the rotation rate of application and removal of a magnetic field per second is called the magnetic field frequency (the unit is Hz). Japanese Patent Unexamined Publication No. 2007-147209 teaches changing the conventional medium used for heat conduction from a liquid refrigerant to a solid heat switch. The change of the medium to the solid heat switch contributes to application and removal of the magnetic field at higher frequency in the magnetic refrigerator, which leads to a reduction in size of the apparatus. This is because solid heat conductivity is higher than liquid heat conductivity, and the time required for disappearance of the temperature gradient via the heat switch (the heat conduction between the magnetic materials) is shortened. In addition, the change of the heat conduction medium from the liquid refrigerant to the solid heat switch eliminates the need for a driving mechanism of the refrigerant, which helps to provide a low-cost magnetic refrigerator.

SUMMARY

However, a reduction in size of the magnetic refrigerator sufficiently has not been accomplished. Magnetic refrigerators may be widely applied to various fields such as electric-powered vehicles and household appliances for the future. In the present circumstances, however, the size of such apparatuses has not been sufficiently reduced, and the practical application of such magnetic refrigerators to electric-powered vehicles and household appliances has not been achieved.

In order to achieve a reduction in size of a magnetic refrigerator, higher frequency is required for application and removal of the magnetic field in a magnetic refrigeration system. This is because a reduction in size of magnetic materials, which is necessary to ensure desired heating and cooling effects, can be achieved by the application and removal of the magnetic field at higher frequency in the magnetic refrigeration system. In other words, even when the temperature change of the magnetic materials caused by the application of the magnetic field each time is small, since the magnetic materials are small, the desired heating and cooling effects can be achieved by repeating the application and removal of the magnetic field at the higher frequency. However, it generally requires a long period of time for disappearance of a temperature gradient between the magnetic materials by use of the heat switch in the magnetic refrigeration system, which is the problem in achieving a higher frequency of the magnetic field application and removal.

The present invention has been made in view of the above-described conventional problems. An object of the present invention is to provide a magnetic structure having improved heat conductivity inside magnetic materials in order to achieve application and removal of a magnetic field at higher frequency in a magnetic refrigeration system. Another object of the present invention is to provide a magnetic heating and cooling apparatus using the magnetic structure with the improved heat conductivity.

A magnetic structure according to a first aspect of the present invention includes: a magnetocaloric material that changes in temperature due to application and removal of a magnetic field; and a high heat conduction member that is in contact with the magnetocaloric material and has higher heat conductivity than the magnetocaloric material.

A magnetic heating and cooling apparatus according to a second aspect of the present invention includes: the plural magnetic structures; a heat switch interposed between the magnetic structures to perform heat conduction and heat insulation; and a magnetic field increasing-decreasing unit that applies or removes a magnetic field to or from each of the magnetic structures.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

Figure 1:
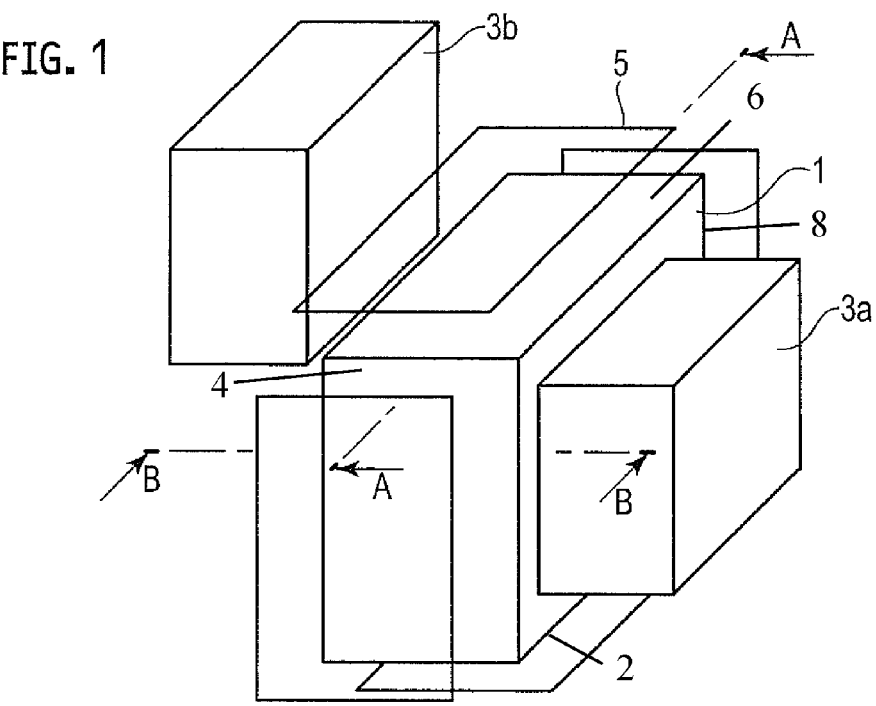
FIG. 1 is a schematic view showing a positional relationship between a magnetic structure and heat switches when the magnetic structure is used in a magnetic heating and cooling apparatus according to the present embodiment.

Hereinafter, embodiments according to the present invention will be explained with reference to the drawings; however, the scope of the present invention should be defined based on the claims and is not limited only to the embodiments described below. It should be noted that dimensional ratios in the drawings are magnified for convenience of explanation and may be different from actual ratios.

A fundamental structure of a magnetic heating and cooling apparatus common to the following embodiments according to the present invention will be explained. FIG. 1 is a schematic view showing a positional relationship between a magnetic structure and heat switches which transmit heat from the magnetic structure to another magnetic structure or a heat exchanger (described below). Here, a material in which a change in temperature is caused due to application and removal of a magnetic field is referred to as "a magnetocaloric material", and a structure including the magnetocaloric material, high heat conduction members, and other elements is referred to as "a magnetic structure".

The fundamental structure of the magnetic heating and cooling apparatus includes a magnetic structure 1, heat switches 3a and 3b, and a magnetic field increasing-decreasing unit (not shown in the figure). The heat switches 3a and 3b are removably inserted and arranged on both surfaces of the magnetic structure 1. Heat is transmitted to the other magnetic structure or the heat exchanger by the insertion and removal of the heat switches 3a and 3b.

FIG. 1 shows a state where the heat switch 3a is inserted into the right surface of the magnetic structure 1. FIG. 1 also shows a state where the heat switch 3b is removed from the left surface of the magnetic structure 1. Note that the right surface of the magnetic structure 1 is a surface hereinafter referred to as a first surface on which the heat switch 3a is arranged. Similarly, the left surface of the magnetic structure 1 is a surface hereinafter referred to as a second surface on which the heat switch 3b is arranged. Although not shown in the figure, other magnetic structures or heat exchangers are present on surfaces on opposite sides of the respective surfaces of the heat switches 3a and 3b that come into contact with the magnetic structure 1. Via the heat switches 3a and 3b, solid heat conduction is performed between the magnetic structure 1 and the other magnetic structures or heat exchangers. Namely, the first surface and the second surface of the magnetic structure 1 function to transmit heat to the other members.

The heat exchangers are provided at both ends of a block in which plural magnetic structures and heat switches are arranged. One end is provided with a low-temperature heat exchanger that extracts a produced cooling effect, and the other end is provided with a high-temperature heat exchanger that extracts a produced heating effect.

Since the front surface 4, the back surface 8, the upper surface 6 and the lower surface 2 of the magnetic structure 1 shown in FIG. 1 do not come into contact with the heat switches 3a and 3b, heat exchange via the heat switches is not carried out on these four surfaces 2, 4, 6, 8. Therefore, the magnetic structure 1 shown in FIG. 1 is covered with a casing 5 having a heat insulation property so that heat generated in magnetocaloric material inside the magnetic structure is not dispersed to the outside of the magnetic structure 1.

The magnetic field increasing-decreasing unit is provided with a pair of permanent magnets on the front surface and the back surface of the magnetic structure 1 so as to hold the magnetic structure 1 from both sides. The application and the removal of the magnetic field are carried out by approach and separation of the permanent magnets to and from the magnetic structure 1. The magnetic field increasing-decreasing unit has configurations similar to those of conventional magnetic heating and cooling apparatuses and therefore, specific explanations thereof are omitted here.

The high heat conduction member is an element included in the magnetic structure 1 in addition to the magnetocaloric material. Here, the high heat conduction member having a plate-like shape may be continuously provided from the first surface to the second surface of the magnetic structure 1. Alternatively, plural members may be connected to each other so as to transmit heat from the first surface to the second surface. In view of the functions of the magnetic structure 1, "two different surfaces" are generally surfaces opposed to each other that come into contact with the heat switches 3a and 3b. The high heat conduction member transmits heat between "the two different surfaces" and thus functions as a passage of heat in the magnetic structure 1.

Magnetic Structure

Hereinafter, embodiments of the magnetic structure having different internal configurations will be explained as a first embodiment to a third embodiment.

Figure 2A:
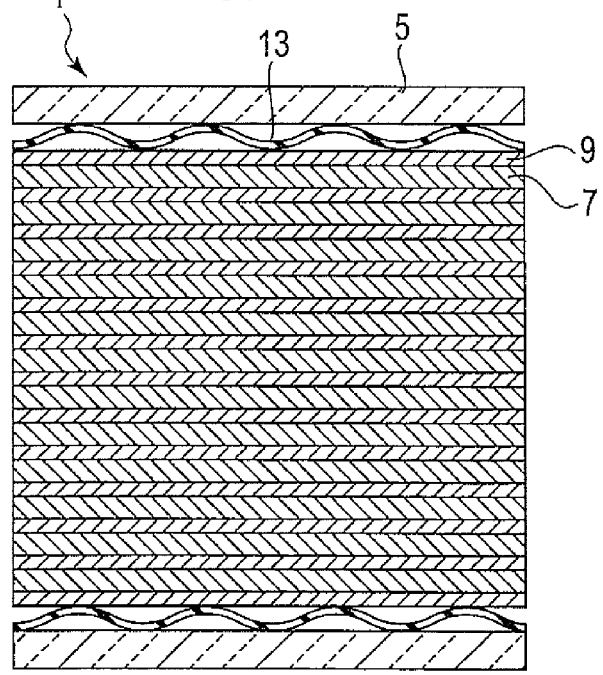
FIG. 2A is a cross-sectional view along the line A-A of the magnetic structure shown in FIG. 1 in a first embodiment.
Figure 2B:
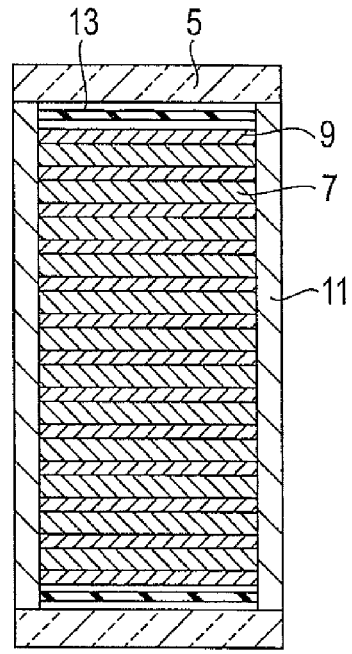
FIG. 2B is a cross-sectional view along the line B-B of the magnetic structure shown in FIG. 1 in the first embodiment, wherein high heat conduction members have a flat-plate structure.

First Embodiment: Magnetic Structure with High Heat Conduction Members Having Flat-Plate Structure FIG. 2A is a cross-sectional view along the line A-A of the magnetic structure 1 shown in FIG. 1 in the first embodiment. FIG. 2B is a cross-sectional view along the line B-B of the magnetic structure 1 shown in FIG. 1 in the first embodiment.

High heat conduction members 9 each have a flat-plate structure according to the present embodiment. Magnetocaloric materials 7 also each have a flat-plate structure. The magnetic structure 1 has a configuration in which the magnetocaloric members 7 and the high heat conduction members 9 are alternately stacked on top of each other.

As shown in FIG. 2A and FIG. 2B, the high heat conduction members 9 are each linearly arranged. As shown in FIG. 2B, the high heat conduction materials 9 are each formed into a plate-like shape extending from the first surface to the second surface. Therefore, heat can be conducted efficiently inside the magnetic structure 1. In this embodiment, the heat conduction direction is the direction from the first surface to the second surface, and vice versa. The magnetocaloric materials 7 and the high heat conduction members 9 are alternately stacked on top of each other in the direction crossing the heat conduction direction. In FIGS. 2A and 2B, the stacking direction of the magnetocaloric materials 7 and the high heat conduction members 9 is a direction substantially perpendicular to the heat conduction direction. Thus, the heat conduction is possible via the high heat conduction members 9 along the shortest path between the first surface and the second surface.

However, the stacking direction of the magnetocaloric materials 7 and the high heat conduction members 9 is not particularly limited as long as it allows heat to be transmitted from the first surface to the second surface (and vice versa) of the magnetic structures 1. Therefore, the stacking direction of the magnetocaloric materials 7 and the high heat conduction members 9 is not necessarily the direction perpendicular to the heat conduction direction, and may be a direction inclined to the heat conduction direction.

As shown in FIG. 2B, surfaces that transmit heat to other members among the outer surfaces of the magnetic structure 1, are each composed of a high heat conduction wall 11 having higher heat conductivity than the magnetocaloric materials 7. Namely, the entire surface of each of the first surface and the second surface of the magnetic structure 1 is provided with the high heat conduction wall 11. The respective end portions in the heat conduction direction of the magnetocaloric materials 7 and/or the high heat conduction members 9 are in contact with the high heat conduction walls 11. The heat transmitted to the respective end portions of the magnetocaloric materials 7 and/or the high heat conduction members 9 may vary depending on the area because of the configuration in which a plurality of members are stacked on top of each other. However, since the entire surface of each of the first surface and the second surface is provided with the high heat conduction wall 11, unevenly transmitted heat is dispersed on the entire surface of the high heat conduction wall 11. Accordingly, the efficiency of the heat conduction between the magnetic structure 1 and the heat switches 3a and 3b can be further improved.

As shown in FIG. 2A and FIG. 2B, each of the upper surface and the lower surface of the stacked body of the magnetocaloric materials 7 and the high heat conduction members 9, that is, at least part of surfaces other than the surfaces that transmit heat to the other members among the outer surfaces of the magnetic structure 1, is covered with a heat insulation elastic body 13. The heat insulation elastic body 13 is further covered with the casing 5. The heat insulation elastic body 13 and/or the casing 5 prevent heat generated in the magnetocaloric materials from being released to the outside of the magnetic structure 1. The heat insulation elastic body 13 and/or the casing 5 also prevent the magnetic structure from being unnecessarily heated by outside air when the temperature of the magnetic structure is lower than the outside temperature. Further, the heat insulation elastic body 13 improves adhesion between the magnetocaloric materials 7 and the high heat conduction members 9 stacked on top of each other, so as to prevent an air layer from being formed between the magnetocaloric materials 7 and the high heat conduction members 9 each having a plate-like shape.

Figure 3:
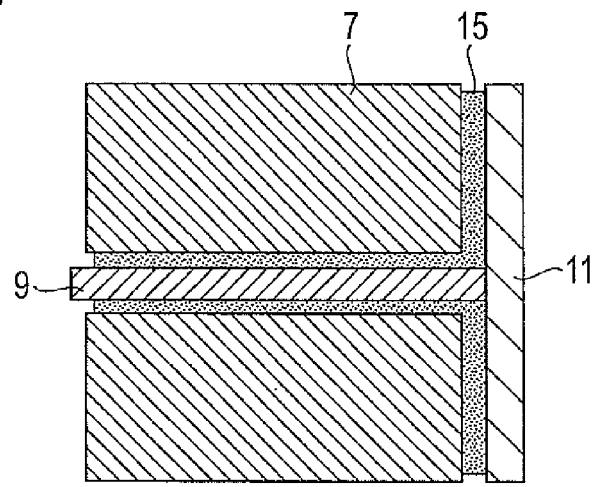
FIG. 3 is a partly enlarged view of FIG. 2B.

FIG. 3 is an enlarged view of a main part of FIG. 2B. As shown in FIG. 3, the magnetocaloric material 7 and the high heat conduction member 9, and the magnetocaloric material 7 and the high heat conduction wall 11 are respectively connected together with an adhesive 15 having high heat conductivity. Due to the adhesive 15, rapid heat conduction is possible between the magnetocaloric material 7 and the high heat conduction material 9 and between the magnetocaloric material 7 and the high heat conduction wall 11. Note that, although the high heat conduction member 9 and the high heat conduction wall 11 are not connected via the adhesive in the present embodiment, these may be connected together with the adhesive.

Figure 4A:
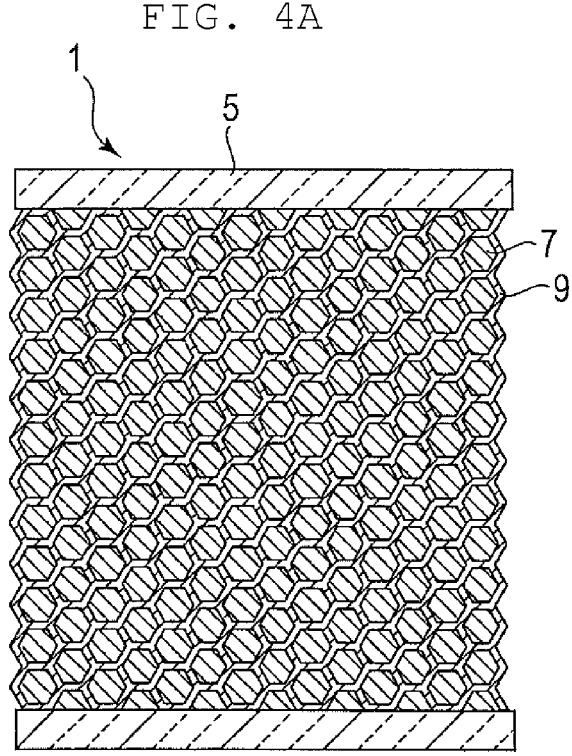
FIG. 4A is a cross-sectional view along the line A-A of the magnetic structure shown in FIG. 1 in a second embodiment.
Figure 4B:
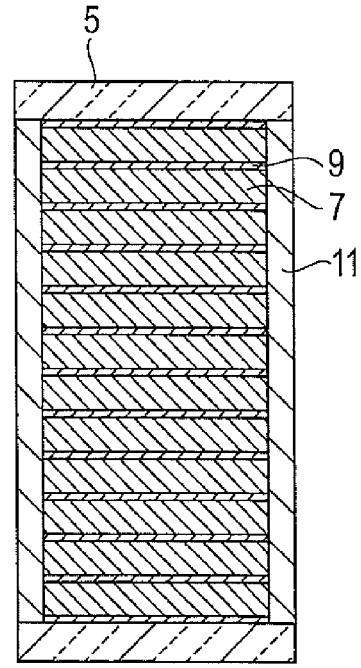
FIG. 4B is a cross-sectional view along the line B-B of the magnetic structure shown in FIG. 1 in the second embodiment, wherein high heat conduction members have a honeycomb structure.

Second Embodiment: Magnetic Structure with High Heat Conduction Members Having Honeycomb Structure FIG. 4A is a cross-sectional view along the line A-A of the magnetic structure 1 shown in FIG. 1 in a second embodiment. FIG. 4B is a cross-sectional view along the line B-B of the magnetic structure 1 shown in FIG. 1 in the second embodiment.

As shown in FIG. 4A, the magnetic structure according to the present embodiment includes the high heat conduction materials 9 having a honeycomb structure in which hexagonal prism holes are regularly arranged. The holes are filled with the magnetocaloric materials 7.

As shown in FIG. 4B, the hexagonal prisms have linear side surfaces. The high heat conduction members 9 are formed from the right surface (the first surface; the surface on which the heat switch 3a is located) to the left surface (the second surface; the surface on which the heat switch 3b is located) in FIG. 4B. Accordingly, rapid heat conduction is possible between the first surface and the second surface of the magnetic structure 1.

In the present embodiment, as long as the first surface and the second surface are continuously connected via the high heat conduction members 9, the magnetic structure 1 of FIG. 1 may turn 90 degrees, namely, the magnetic structure 1 may have a configuration in which the positions of FIG. 4A and FIG. 4B are reversed. The surfaces in contact with the high heat conduction members 9 (the first surface and the second surface) are also provided with the high heat conduction walls 11 in FIG. 4B. Although not shown in FIG. 4A or FIG. 4B, at least two members selected from the group consisting of the magnetocaloric material 7, the high heat conduction member 9 and the high heat conduction wall 11 may be connected together with the adhesive as in the case of the first embodiment.

Although FIGS. 4A and 4B show the configuration of the honeycomb structure in which the hexagonal prism holes are regularly arranged, the present embodiment is not limited thereto. For example, cylindrical (including cylindroid) holes or polygonal prism holes such as triangular prism, quadrangular prism or pentangular prism holes may be arranged regularly.

In the present embodiment, as in the case of the first embodiment, the surfaces not transmitting heat may be covered with the heat insulation elastic body and further covered with the casing. Here, a heat insulation material without elasticity may be used instead of the heat insulation elastic body. This is because, as explained above, the holes of the high heat conduction members 9 having a honeycomb structure are filled with the magnetocaloric materials 7 in the second embodiment, and there is no need to press the high heat conduction members 9 and the magnetocaloric materials 7. Note that, although a specific material of the heat insulation elastic body will be explained below, the heat insulation material is referred to as the heat insulation elastic body since some heat insulation materials also have elasticity.

Third Embodiment: Magnetic Structure with High Heat Conduction Members Having Porous Structure FIG. 5 is a photograph showing a microstructure of the high heat conduction member used in a third embodiment.

Figure 5:
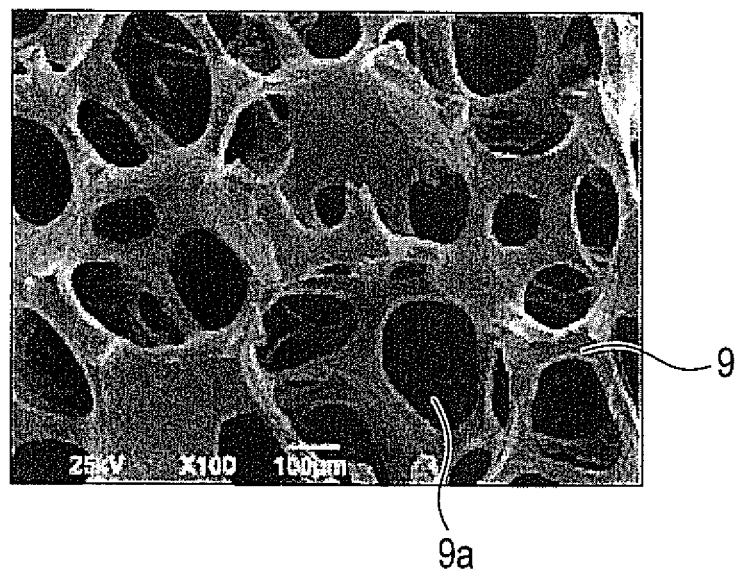
FIG. 5 is a photograph showing a microstructure of a high heat conduction member used in a third embodiment, wherein the high heat conduction member has a microporous structure.

As is clear in FIG. 5, the high heat conduction member according to the present embodiment has a porous structure. The magnetic structure according to the present embodiment includes the high heat conduction member 9 having a porous structure in which holes 9a are filled with the magnetocaloric material. Therefore, in the cross-sectional view along the line A-A and the cross-sectional view along the line B-B of the magnetic structure 1 shown in FIG. 1, the high heat conduction member 9 has a continuously-connected netlike pattern. The high heat conduction member 9 having such a porous structure contributes to efficient heat conduction in the magnetic structure.

As in the case of the first embodiment or the second embodiment, the high heat conduction wall may be formed in the present embodiment. In addition, at least two members selected from the group consisting of the magnetocaloric material, the high heat conduction member and the high heat conduction wall may be connected together with the adhesive.

In the present embodiment also, the surfaces not transmitting heat may be covered with the heat insulation elastic body and further covered with the casing. Here, a heat insulation material without elasticity may be used instead of the heat insulation elastic body. This is because, as explained above, the holes 9a of the high heat conduction member 9 having a porous structure are filled with the magnetocaloric material 7 in the third embodiment, and there is no need to press the high heat conduction member 9 and the magnetocaloric material 7. Note that, although a specific material of the heat insulation elastic body will be explained below, the heat insulation material is referred to as the heat insulation elastic body since some heat insulation materials also have elasticity.

Although the first embodiment to the third embodiment have been explained above, the present invention is not limited to these, and other embodiments that a person skilled in the art could conceive of may also be included in the scope of the present invention. For example, a magnetic structure obtained by a combination of the first embodiment and the second embodiment may be used. In order to ensure necessary performance of the magnetic structure, the shape and size of the magnetocaloric material, the shape and size of the high heat conduction member, the gap between the stacked layers (the first embodiment), the configuration of the honeycomb structure (the second embodiment), and the porosity of the high heat conduction member (the third embodiment) are determined as appropriate by a person skilled in the art. Similarly, optional elements of the magnetic structure including the high heat conduction wall, the adhesive, the heat insulation elastic body, the casing, and the other elements are also determined as appropriate by a person skilled in the art.

Hereinafter, the members used in the magnetic structure common to the respective embodiment are explained in detail.

Magnetocaloric Material

The magnetocaloric material is a material of which temperature increases or decreases when a magnetic field is applied or removed, and forms the core of the magnetic refrigeration system.

The magnetocaloric material is divided into a positive magnetocaloric material and a negative magnetocaloric material. As described above, the positive magnetocaloric material produces heat when a magnetic field is applied and absorbs heat when the magnetic field is removed. In particular, the positive magnetocaloric material is a material that reversibly causes a paramagnetic state and a ferromagnetic state, in which the paramagnetic state (magnetic spins are in a disordered state) is caused when magnetism is not applied, and the ferromagnetic state (all directions of magnetic spins are the same) is caused when magnetism is applied.

The negative magnetocaloric material absorbs heat when a magnetic field is applied and produces heat when the magnetic field is removed. In particular, the negative magnetocaloric material is a material that reversibly causes a ferromagnetic state and an antiferromagnetic state, in which the antiferromagnetic state is caused when magnetism is not applied, and the ferromagnetic state is caused when magnetism is applied. The antiferromagnetic state is a state in which magnetic spins adjacent to each other are arranged to face in opposite directions. The ferromagnetic state is a state where all directions of magnetic spins are the same. In general, positive magnetocaloric materials have larger fluctuation in temperature caused by application (removal) of a magnetic field but tend to have slower heat conduction than negative magnetocaloric materials.

Examples of the positive magnetocaloric material used in the present embodiment include, but are not limited to, Gd—Y series, Gd—Dy series, Gd—Er series, Gd—Ho series, La(Fe, Si)$_{13}$, and La(Fe, Al)$_{13}$ magnetocaloric materials. With regard to heat conductivity of these materials, for example, the heat conductivity of the Gd—Dy series material is 10 (W/(m·K)), and the heat conductivity of the La(Fe, Si)$_{13}$ material is 9 (W/(m·K)).

Examples of the negative magnetocaloric material used in the present embodiment include, but are not limited to, a Fe—Rh alloy, Co—Mn—Si—Ge series and Ni—Mn—Sn series magnetocaloric materials. With regard to heat conductivity of these materials, for example, the heat conductivity of the Ni—Mn—Si series material is 20 (W/(m·K)).

The positive magnetocaloric materials or the negative magnetocaloric materials used are not necessarily the same, and several kinds of the positive magnetocaloric materials or the negative magnetocaloric materials may be used. For example, in the second embodiment, each of the pores of the honeycomb structure may be filled with different kinds of magnetocaloric materials, or several kinds of magnetocaloric materials may be filled in the pores of the honeycomb structure. Alternatively, the positive magnetocaloric material and the negative magnetocaloric material may be mixed so as to control fluctuation in temperature caused in the magnetocaloric material when a magnetic field is applied (removed). However, in view of the mechanism of the magnetic refrigeration system, and application and removal of a magnetic field at higher frequency and higher output performance of the magnetic refrigeration system, a single magnetocaloric material is preferably used in one magnetic structure.

The shape of the magnetocaloric material is not particularly limited and conventionally known shapes may be used. For example, the first embodiment may use the plate-like magnetocaloric material or may use a material obtained in a manner such that a spherical magnetocaloric material is molded and processed to have a flat-plate structure.

High Heat Conduction Member

The high heat conduction member is an element of the magnetic structure contributing to efficient conduction of all or part of heat produced in the magnetocaloric material. At least two different surfaces (the first surface and the second surface opposed to each other in the respective embodiments) among the surfaces of the magnetic structure communicate with each other via the high heat conduction member. The use of the high heat conduction member can rapidly transmit all of or part of heat produced in the magnetocaloric material. The high heat conduction member helps to transmit heat in the magnetic structure. Thus, part of heat may be transmitted via the magnetocaloric material.

The respective embodiments have exemplified the case in which the high heat conduction member is composed of one member but are not limited to the configuration of the single high heat conduction member. The respective embodiments may employ a configuration in which the high heat conduction member is composed of two members in contact with each other.

The type of the high heat conduction member applied varies depending on the intended use. If the size of the heating and cooling apparatus to which the high heat conduction member is applied is preferably decreased to the extent possible, a high heat conduction member having higher heat conductivity is preferably used since higher frequency is required for application and removal of a magnetic field. The high heat conduction member is appropriately selected by a person skilled in the art depending on a desired magnetic structure so that a preferable high heat conduction member is used. Alternatively, several kinds of high heat conduction members may be used so as to control heat conduction characteristics of the magnetic structure.

The high heat conduction member is not particularly limited as long as it has higher heat conductivity than the magnetocaloric material. The high heat conduction member preferably has heat conductivity of 200 (W/(m·K)) or greater. Specific examples of the high heat conduction member include an aluminum alloy, copper, carbon nanotube, and a composite material including an aluminum alloy and carbon nanotube. The heat conductivity of the aluminum alloy is approximately 200 (W/(m·K)), and the heat conductivity of copper is approximately 380 (W/(m·K)). The heat conductivity of carbon nanotube is approximately 6000 (W/(m·K)), and the heat conductivity of the composite material of the aluminum alloy and the carbon nanotube is approximately 800 (W/(m·K)). As is clear from the high heat conductivity of these materials, the use of the high heat conduction member in the magnetic structure can efficiently transmit heat produced in the magnetic structure.

The high heat conduction member has a flat-plate structure in the first embodiment, has a honeycomb structure in the second embodiment, and has a porous structure in the third embodiment. However, the high heat conduction member is not limited to the configurations of these embodiments and may have other configurations.

High Heat Conduction Wall

The high heat conduction wall is an optional element of the magnetic structure that functions to efficiently transmit heat transmitted inside the magnetic structure to the heat switches.

The material of the high heat conduction wall is not particularly limited as long as it has high heat conductivity and may be the same as that of the high heat conduction member. For example, copper can rapidly disperse uneven transmitted heat to the entire surface since copper has high heat conductivity.

The shape of the high heat conduction wall is not particularly limited, but is preferably a planar configuration in order to increase contact areas with the heat switches in view of solid heat conduction with the heat switches in the magnetic heating and cooling apparatus. The high heat conduction wall is not necessarily formed on the entire surfaces of the magnetic structure and may be formed on part of the surfaces of the magnetic structure.

Adhesive

The adhesive is an optional element of the magnetic structure that functions to help heat conduction between at least two members selected from the group consisting of the magnetocaloric material, the high heat conduction member and the high heat conduction wall. Since these members may be provided with an air layer therebetween, and such an air layer has high heat insulation effect, it is preferable to connect the members via the adhesive to efficiently transmit heat therebetween.

In particular, since the first embodiment includes the magnetocaloric materials and the high heat conduction members each having a flat-plate structure and being stacked on top of each other, an air layer may be formed between the magnetocaloric materials and the high heat conduction members. Therefore, a connection layer is preferably formed between the magnetocaloric materials and the high heat conduction members by use of the adhesive.

In contrast, the second embodiment includes the high heat conduction member having a honeycomb structure, in which the holes in the high heat conduction member are densely filled with the magnetocaloric material. This configuration decreases the possibility that heat conduction is inhibited because of a provision of an air layer. Similarly, since the third embodiment includes the high heat conduction member having a porous structure, in which the holes in the high heat conduction member are densely filled with the magnetocaloric material, the possibility that heat conduction is inhibited because of a provision of an air layer is decreased. Although it is not necessary to form a connection layer between the magnetocaloric material and the high heat conduction member by use of the adhesive in the second and third embodiments, the magnetocaloric member and the high heat conduction member may be connected via the adhesive in order to improve adhesion therebetween.

Here, there is a possibility of an air layer being provided between the magnetocaloric material/the high heat conduction member and the high heat conduction wall in each of the first embodiment to the third embodiment. Therefore, a connection layer is preferably formed between the magnetocaloric material/the high heat conduction member and the high heat conduction wall by use of the adhesive.

The adhesive is not particularly limited as long as it does not diminish generated heat and does not inhibit heat conduction. Examples of the adhesive include gold, copper, palladium, tin, lead, zinc, bismuth, cadmium, indium, and an alloy or an eutectic body containing these metals. Aluminum or silver may be further added as an additive. Among these, Sn—Zn—Al obtained in a manner such that a small amount of aluminum is added to a tin-zinc alloy without lead is preferably used because it has heat conductivity as high as 66 (W/(m·K)) and it is an environmentally-friendly material. In particular, fusible metals such as tin, lead and indium are preferable since adhesive temperature thereof is low so that adhesive energy can be reduced, and since adhesion to the receiving part is high so that porosity can be decreased.

The method of adhesion with the adhesive is not particularly limited and may be conventionally-known methods such as diffusion bonding, micro bonding, mechanical bonding, eutectic bonding, ultrasonic bonding, and solder bonding.

In addition to the formation of the connection layer by use of the adhesive to completely exclude an air layer, other connection methods may be included in the scope of the present invention. In other words, an air layer may be provided as long as heat produced in the magnetocaloric material is transmitted between the respective members. For example, the respective members may be connected together at fixed intervals by use of rod-like carbon nanotube.

Heat Insulation Elastic Body

First, the heat insulation elastic body has a heat-insulating property to prevent heat produced in or absorbed by the magnetic structure from being dispersed to members other than the members to which the heat is to be transmitted.

Second, the heat insulation elastic body has a function to improve adhesion between the magnetocaloric material and the high heat conduction member. The heat insulation elastic body also improves a bond between the magnetocaloric material and the high heat conduction member when these are bonded together. The heat insulation elastic body functioning to improve the adhesion is mainly used in the first embodiment. As explained above, the first embodiment has a structure in which the plate-like magnetocaloric materials and high heat conduction members are stacked on top of each other. Therefore, the heat insulation elastic body is provided on the outside of one of the outermost layers of the stacked body so as to press the stacked plate-like magnetocaloric materials and high heat conduction members. This heat insulation elastic body prevents an air layer from being formed between the magnetocaloric materials and the high heat conduction members so as to improve heat conduction performance in the magnetic structure.

The heat insulation elastic body is located on a surface other than the surfaces that transmit heat to the other members (namely a surface not transmitting heat) in the magnetic structure. The heat insulation elastic body is not particularly limited as long as it prevents heat produced in the magnetic structure from being released to the outside and presses the stacked magnetocaloric materials and high heat conduction members. Specific examples of the heat insulation elastic body include natural rubber, acrylic rubber, nitrile rubber, isoprene rubber, urethane rubber, ethylene-propylene rubber, chlorosulfonated polyethylene, epichlorohydrin rubber, chloroprene rubber, silicone rubber, styrene-butadiene rubber, butadiene rubber, and fluororubber.

If focusing only on the heat insulation performance, the heat insulation elastic body may also be applied to the other embodiments in addition to the first embodiment. In such a case, elasticity is not required. If focusing on the elasticity, on the other hand, a plate spring or a coil spring may be provided between the casing and the respective outermost layers of the stacked body so as to provide an air layer to ensure both heat insulation and elasticity.

Casing

The casing is an optional element of the magnetic structure that functions to keep heat produced by the magnetocaloric effect inside the magnetic structure without releasing to the outside. When the magnetic structure includes the casing, the magnetic structure has a polyhedral structure in the nature of the casing. Surfaces other than the surfaces that transmit heat to the other members among the outer surfaces of the magnetic structure, are covered with the casing. Namely, the casing covers the surfaces other than the surfaces on which the high heat conduction members are exposed. The casing is preferably bonded to the magnetic structure in order to effectively achieve heat insulation performance. In an embodiment, when the magnetic structure includes the heat insulation elastic body, the casing is located outside the heat insulation elastic body.

The casing used in the present embodiment is not particularly limited as long as it has low heat conductivity. Examples of the casing include glass wool, rock wool, cellulose fiber, phenol foam, polystyrene foam, rigid urethane foam, polyvinyl chloride foam, polyimide foam, ethylene propylene diene rubber (EPDM) foam, and extrusion foaming polystyrene.

Other Elements

In addition to the elements of the magnetic structure described above, other elements may be included in the magnetic structure depending on the intended use or function. For example, in order to further increase heat conduction, diamond powder (such as nanodiamond) may be contained as high heat conduction grease. In addition, conventionally-known additives may be further added as appropriate in order to achieve desired objects when applied to the magnetic heating and cooling apparatus.

Heating and Cooling Apparatus

The magnetic heating and cooling apparatus of the present invention uses the magnetic structure according to any one of the embodiments described above. Therefore, the heating and cooling apparatus of the present invention is capable of application and removal of a magnetic field at higher frequency due to the high heat conduction performance of the magnetic structure, thereby ensuring higher output and a reduction in size. The heating and cooling apparatus includes the magnetic structure block, the heat switch and the magnetic field increasing-decreasing unit as minimum elements.

The magnetic structure block is obtained in a manner such that two or more magnetic structures are arranged at fixed intervals. At least one of the magnetic structures used is the magnetic structure according to any of the embodiments described above. The other magnetic structures composing the magnetic structure block may be conventionally-known magnetic structures. However, in view of the application and removal of the magnetic field at higher frequency, all of the magnetic structures composing the magnetic structure block are preferably the magnetic structures according to any of the embodiments of the present invention.

The heat switch is a solid heat conduction member removably inserted and arranged between the magnetic structures composing the magnetic structure block. When the heat switch is inserted into the gap between the magnetic structures, heat conduction occurs between the magnetic structures adjacent to each other via the heat switch so that a temperature gradient disappears. When the heat switch is removed from the gap between the magnetic structures, an air layer having a high heat insulation effect is formed because of the absence of the heat switch, and heat conduction does not occur between the magnetic structures adjacent to each other because of the removed heat switch. The heat switch is used for solid heat conduction between the magnetic structures and therefore, the heat switch is in contact with each of the magnetic structures at one point. In view of efficient solid heat conduction, the heat switch is preferably in contact with each of the magnetic structures with larger areas as much as possible.

For example, the solid heat conduction member serving as such a heat switch is preferably metal having high heat conductivity such as aluminum, copper or stainless steel. Alternatively, the heat conduction member may be a single substance or an alloy of these metals, or a composite of plural metals. Another example of the heat conduction member may be ceramics having high heat conductivity.

The magnetic field increasing-decreasing unit is composed of a pair of permanent magnets that interpose the magnetocaloric material therebetween. The application and removal of the magnetic field can be achieved due to the pair of permanent magnets. In an embodiment, the application and removal of the magnetic field is achieved by the movement of the permanent magnets.

Here, the heat insulation elastic body described above may have a characteristic that causes a decrease in magnetic force. When the heat insulation elastic body having the characteristic that causes a decrease in magnetic force is used, the heat insulation elastic body is preferably arranged in a manner such that lines of magnetic force from the magnetic field increasing-decreasing unit do not pass through the heat insulation elastic body. For example, the cross-sectional view of FIG. 2A and FIG. 2B show that the magnetic structure 1 is interposed between the heat insulation elastic bodies 13 from the upper surface and the lower surface. In order to effectively utilize the lines of magnetic force caused by the magnetic field increasing-decreasing unit, the magnetic field increasing-decreasing unit is preferably provided on both front surface and back surface in FIG. 1 so that the lines of magnetic force do not pass through the heat insulation elastic bodies 13. When the heat insulation elastic body does not cause or hardly causes a decrease in magnetic force, the heat insulation elastic body may be arranged in a manner such that the lines of magnetic force pass through the heat insulation elastic body.

The type, size and shape of the heat switch and the permanent magnets used are not particularly limited and conventionally-known type, size and shape may be selected as appropriate depending on the desired heating and cooling apparatus. Other members used for the magnetic heating and cooling apparatus are also selected as appropriate by a person skilled in the art depending on the desired heating and cooling apparatus. Examples of the other members include a low-temperature heat exchanger that extracts a cooling effect produced by the magnetic refrigeration system, a high-temperature heat exchanger that extracts a heating effect produced by the magnetic refrigeration system, a controller that controls the magnetic heating and cooling apparatus, and a motor that operates the magnetic heating and cooling apparatus.

Fourth Embodiment: Embodiment Including Eddy-Current Prevention Member

A fourth embodiment includes an eddy-current prevention member inserted to decrease an eddy-current loss generated when a magnetic field is applied.

Figure 6A:
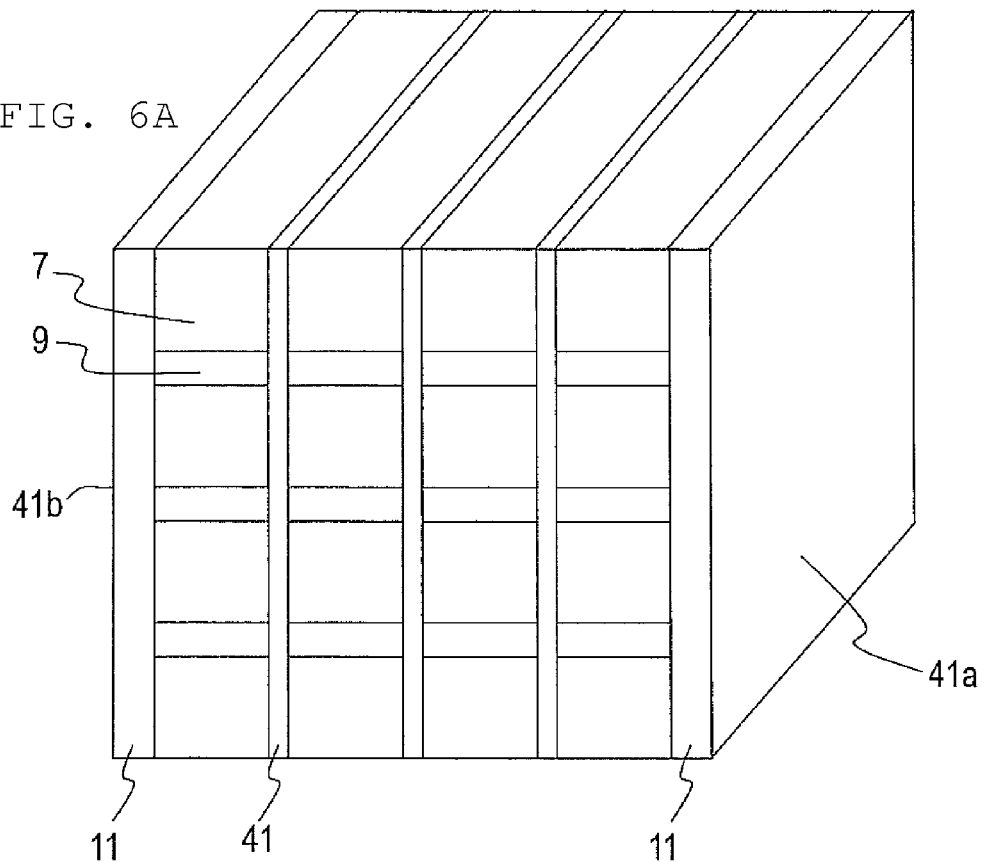
FIGS. 6A and 6B are views for explaining a magnetic structure according to a fourth embodiment, with FIG. 6A being a perspective view showing a main part, and FIG. 6B being a cross-sectional view for explaining a relationship between the magnetic structure and lines of magnetic force of a magnetic field applied when the magnetic structure is used in a magnetic heating and cooling apparatus.
Figure 6B:
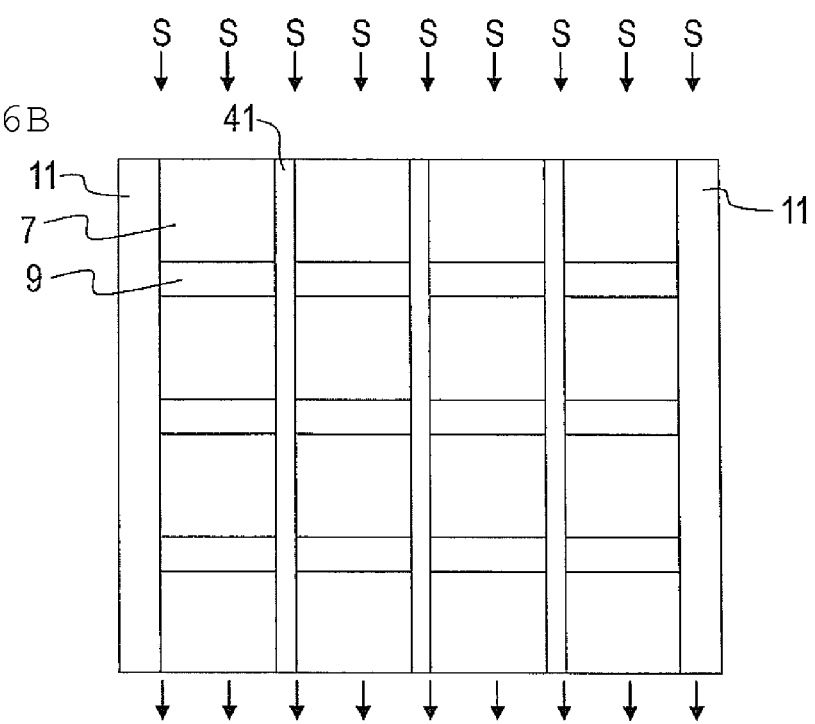
Figure 7:
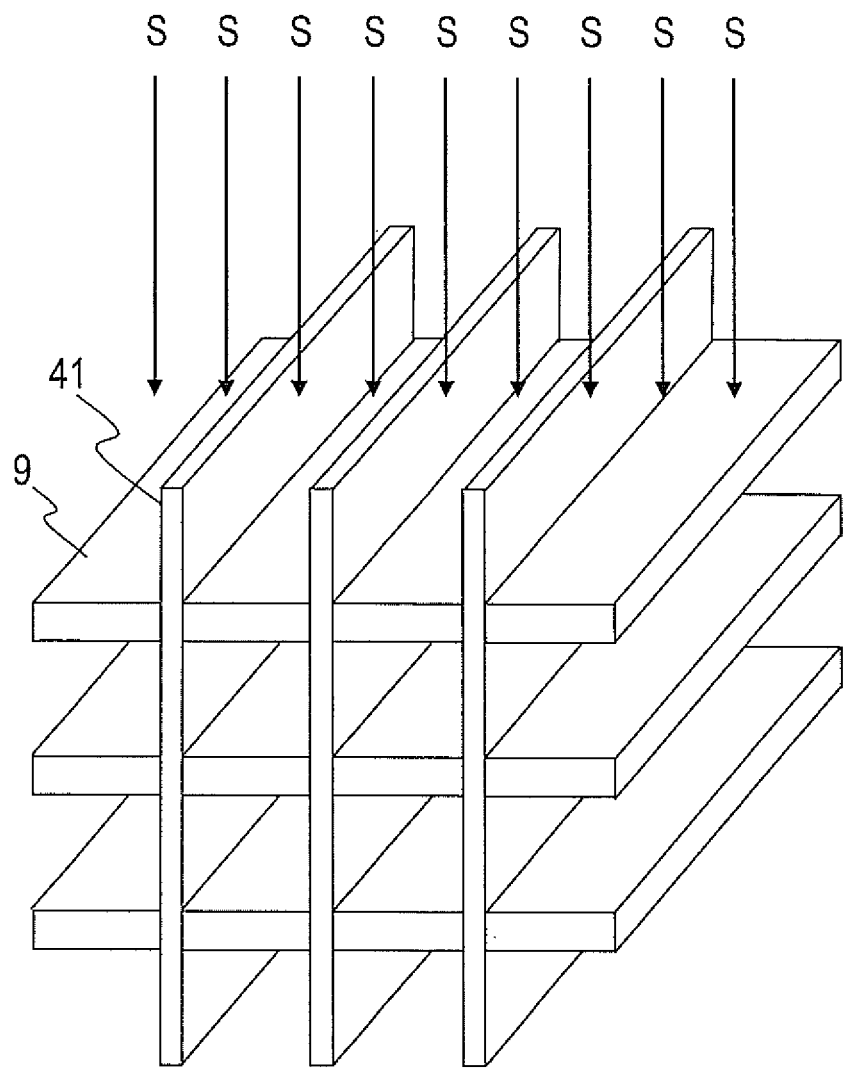
FIG. 7 is a perspective view showing only extracted high heat conduction members and eddy-current prevention members according to the fourth embodiment.

FIGS. 6A and 6B are views for explaining the magnetic structure according to the present embodiment. FIG. 6A is a perspective view showing the main part, and FIG. 6B is a cross-sectional view for explaining the relationship between the magnetic structure and lines of magnetic force of a magnetic field applied when the magnetic structure is used in the magnetic heating and cooling apparatus. FIG. 7 is a perspective view showing only high heat conduction members and eddy-current prevention members extracted for explaining the present embodiment.

The magnetic structure 1 of the present embodiment includes the plate-like magnetocaloric materials 7 and the plate-like high heat conduction members 9 stacked on top of each other, basically as in the case of the first embodiment. The stacked direction is a direction of lines of magnetic force applied when the magnetic structure 1 is used in the magnetic heating and cooling apparatus. Namely, both the magnetocaloric materials 7 and the high heat conduction members 9 are placed extending in the direction across the lines of magnetic force.

The eddy-current prevention members 41 are further inserted in the magnetic structure 1 in the present embodiment. The plural eddy-current prevention members 41 are arranged in the direction parallel to the lines of magnetic force (arrows S in the figure). The eddy-current prevention members 41 divide the magnetocaloric materials 7 and the high heat conduction members 9.

The eddy-current prevention members 41 function to prevent or control eddy current generated when the lines of magnetic force pass through the plate-like magnetocaloric materials 7 and high heat conduction members 9. As is well known, eddy current is a current caused in a whirl around an axis in a crossing direction of lines of magnetic force when the lines of magnetic force pass through a conductive member. Once the eddy current is caused, heat is produced because of resistance of the conductive member, which results in an eddy-current loss. In the magnetic structure, heat is produced because of the eddy current since the magnetocaloric materials 7 and the high heat conduction members 9 are conductive members. As a result, a sufficient cooling effect may not be obtained because of the produced heat of the eddy-current loss even if the magnetocaloric materials 7 are cooled (absorb heat) by the application of the magnetic field.

In view of this, according to the present embodiment as shown in FIGS. 6A and 6B, the plural eddy-current prevention members 41 are arranged in the direction parallel to the lines of magnetic force to divide the plate-like magnetocaloric materials 7 and high heat conduction members 9, thereby preventing a flow of the eddy current.

In order to prevent the flow of the eddy current, the eddy-current prevention members 41 are required to have electric conductivity lower than that of at least the high heat conduction members 9.

Here, specific examples of electric conductivity of the materials described above used as the high heat conduction members are as follows. Aluminum (single Al) is $37.4 \times 10^6$ (siemens/m) (0° C.), copper is $59.0 \times 10^6$ (siemens/m) (0° C.), and carbon nanotube is $7.5 \times 10^7$ (siemens/m) (0° C.).

Thus, when the eddy-current prevention members 41 include a material having lower electric conductivity than these materials used as the high heat conduction member, generation of the eddy current can be prevented or controlled. The material having lower electric conductivity is preferably a material with less than $1.0 \times 10^1$ (siemens/m) (0° C.).

The eddy-current prevention members 41 are arranged in the direction to cut off heat conduction (from the first surface to the second surface). Here, if a material having low heat conductivity is used as the eddy-current prevention members 41, the heat conductivity in the magnetic structure decreases even though the high heat conduction members are included. Thus, the eddy-current prevention members 41 also employ a material having higher heat conductivity than at least the magnetocaloric materials. Namely, the eddy-current prevention members 41 employ a material having higher heat conductivity than the magnetocaloric materials and having lower electric conductivity than the high heat conduction members.

In particular, for example, the eddy-current prevention members 41 are preferably diamond-like carbon. The diamond-like carbon has, for example, electric conductivity of $10^{-12}$ (siemens/m) and heat conductivity in a range from 200 to 700 (W/(m·K)), although these values slightly vary depending on the structure and density of the diamond-like carbon.

Alternatively, the eddy-current prevention members 41 may employ heat conductive ceramics. A specific example of the heat conductive ceramics may be silicon nitride ceramics. The silicon nitride ceramics have electric conductivity of $3.0 \times 10^{-11}$ (siemens/m) and heat conductivity of 200 (W/(m·K)).

Modified Example of Fourth Embodiment

Figure 8:
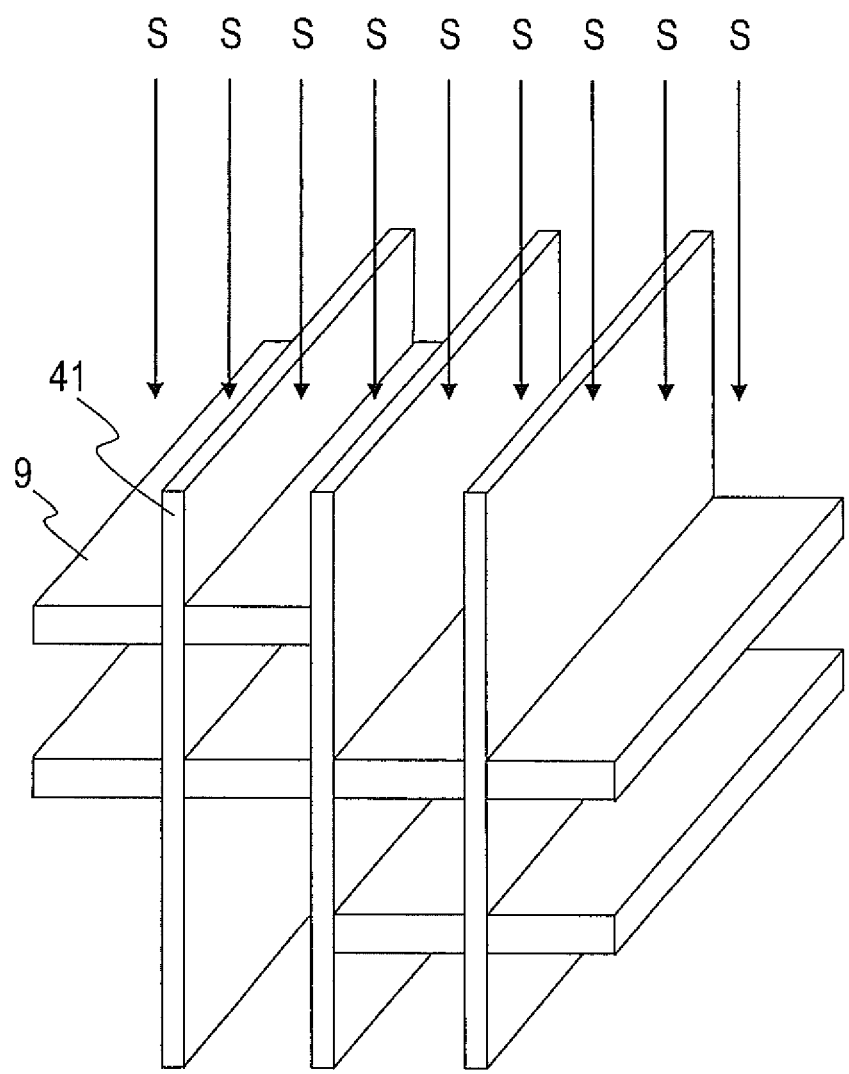
FIG. 8 is a perspective view for explaining a modified example of the eddy-current prevention members having a different insertion configuration according to the fourth embodiment.
Figure 9:
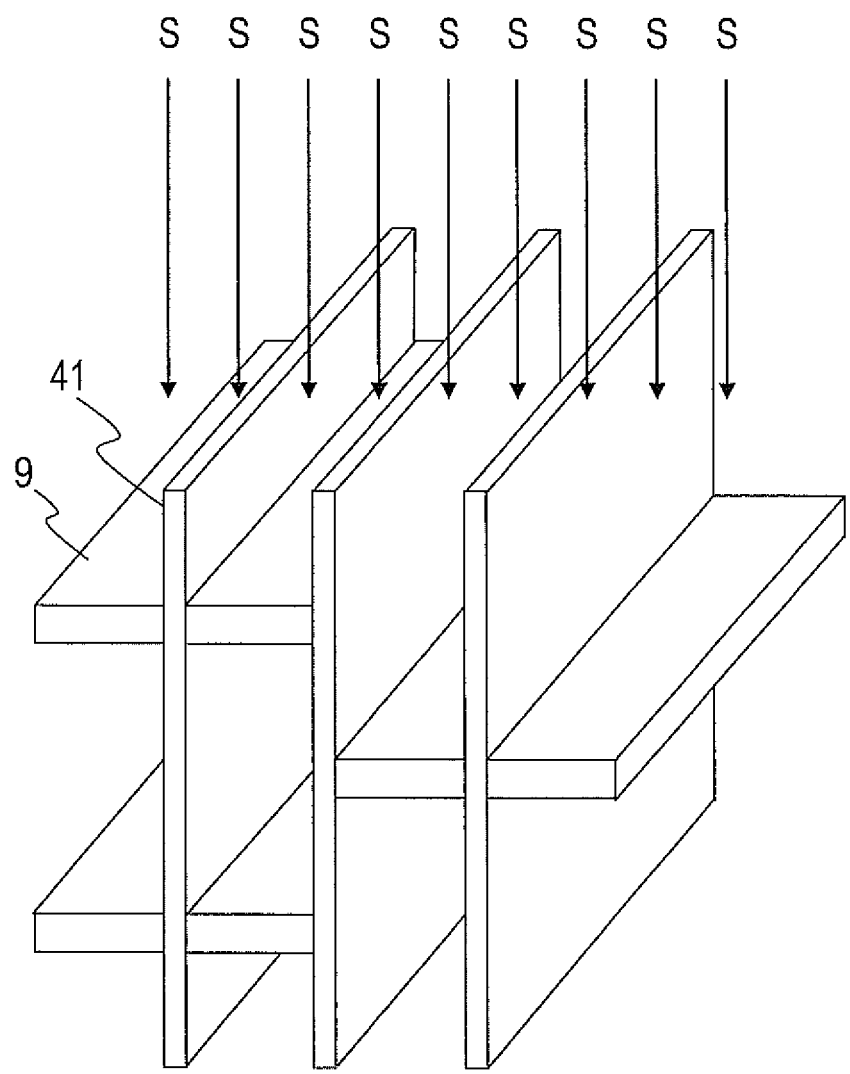
FIG. 9 is a perspective view for explaining another modified example of the eddy-current prevention members having a different insertion configuration according to the fourth embodiment.

FIG. 8 and FIG. 9 are perspective views for explaining different examples of the insertion configuration of the eddy-current prevention members. FIG. 8 and FIG. 9 are also perspective views only showing extracted high heat conduction members and eddy-current prevention members. FIG. 8 shows a configuration in which the stacked high heat conduction members are divided in every other layer. FIG. 9 shows a configuration in which the stacked high heat conduction members are divided in each layer.

The configuration in which the high heat conduction members 9 are divided in every other layer or in each layer can further prevent or control the eddy-current generation in association with the insertion of the eddy-current prevention members.

As explained above, the eddy-current prevention members 41 also employ a material having high heat conductivity. Therefore, due to the configuration described above, the heat transmitted through the high heat conduction members 9 is transmitted to the eddy-current prevention members 41, and the heat thus transmitted is again transmitted to the high heat conduction members 9. Consequently, the heat is transmitted from the first surface 41a to the second surface 41b.

Estimation Calculation of Eddy-Current Loss

Here, the calculation results of the eddy-current loss by use of the following formula are explained below.

$$Pe = (\pi^2/6) \cdot Bm^2 \cdot f^2 \cdot T^2 \cdot \sigma$$

where Pe represents an eddy-current loss, Bm represents a maximum magnetic flux density, f represents a frequency, T represent a plate thickness, and σ represents electric conductivity.

For the calculation, the following magnetic heating and cooling apparatus was supposed.
Heating and cooling performance: 6 kW, 2 liters
Magnetocaloric material (MCM): gadolinium (Gd)
Thickness of Gd (MCM): 1 mm
With regard to physical properties of Gd; specific heat: 0.071 (cal/g·K), electric conductivity: 0.736×10$^6$ (siemens/m)
Gd used amount: 5.26 kg
Magnetic field application frequency: 50 Hz
Strength of magnetic field: 1.5 T Calculation Results Calorific value (s) of MCM (Gd) by eddy current: 4.38 W, temperature increasing rate per minute: 0.17 degrees (10 degrees increase for one hour)

Here, when the eddy-current prevention members including a low-electric conductive material are inserted, the used amount of Gd (MCM) is not changed and the divided thickness of Gd (MCM) is set to 1/10, the calorific value by the eddy current can be reduced to 0.0438 W. Therefore, the temperature of Gd (MCM) only increases by 0.1 degree after one hour.

Figure 10:
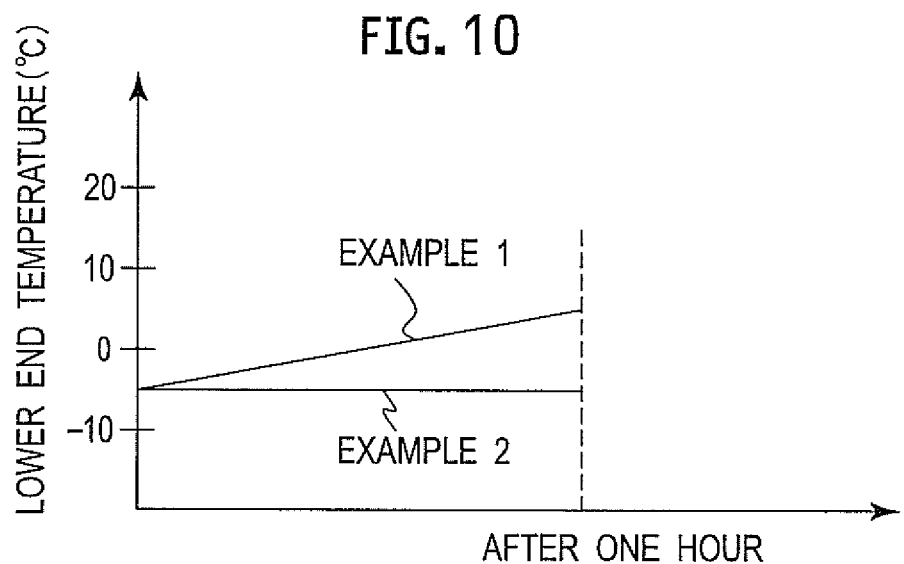
FIG. 10 is a graph showing a temperature variation at the lowest temperature in a magnetic heating and cooling apparatus.

The magnetic heating and cooling apparatus was supposed to be capable of cooling from room temperature (25° C.) at the point of starting the magnetic heating and cooling operation to a lowest temperature of −5° C. Namely, the apparatus can ensure a temperature difference of 30° C. between air and the lowest temperature at the point of heat exchange with air starting at 25° C. FIG. 10 is a graph showing the temperature variation of the lowest temperature in the magnetic heating and cooling apparatus supposed to have such magnetic heating and cooling performance.

The above-described calculation revealed that the lowest temperature after one hour is 5° C. when no eddy-current prevention member is inserted (Example 1 in FIG. 10). Thus, the temperature difference between the air and the lowest temperature is 20° C., which results in a decrease in cooling performance by 30% or greater.

On the other hand, the decrease in heating and cooling performance can be approximately zero when the eddy-current prevention members are inserted (Example 2 in FIG. 10). Accordingly, the prevention or control of the eddy current generation increases the heating and cooling performance by 50% compared with the case of not taking such measures.

As described above, according to the fourth embodiment, the eddy-current prevention members prevent or control eddy current generated particularly in the high heat conduction members so as to prevent or control unnecessary heat generation caused by the eddy-current loss. In particular, in the present embodiment, since the plate-like magnetocaloric materials and high heat conduction members are divided by the eddy current prevention members, the eddy current generated in both the magnetocaloric materials and the high heat conduction members can be prevented or controlled.

The present embodiment exemplified the configuration in which the plate-like magnetocaloric materials and high heat conduction members are stacked on top of each other. However, the second embodiment and the third embodiment may have the configuration in which the eddy-current prevention members are arranged in the direction parallel to the lines of magnetic force, as in the case of this embodiment, so as to obtain similar effects.

Other Heating and Cooling Apparatus

In the embodiments explained above, the insertion and extraction of the heat switches 3a and 3b, which are located between the magnetic structures adjacent to each other and between the magnetic structure and the heat exchanger, control switching from heat conduction to heat insulation therebetween. Namely, the heat switches themselves move. Here, the heat exchanger includes the low-temperature heat exchanger and the high-temperature heat exchanger as described above. Hereinafter, the magnetic heating and cooling apparatus will be explained using heat switches of other examples to transmit heat therebetween without movement (insertion and removal) of the heat switches themselves.

Another Example 1 of Heat Switches

Figure 11:
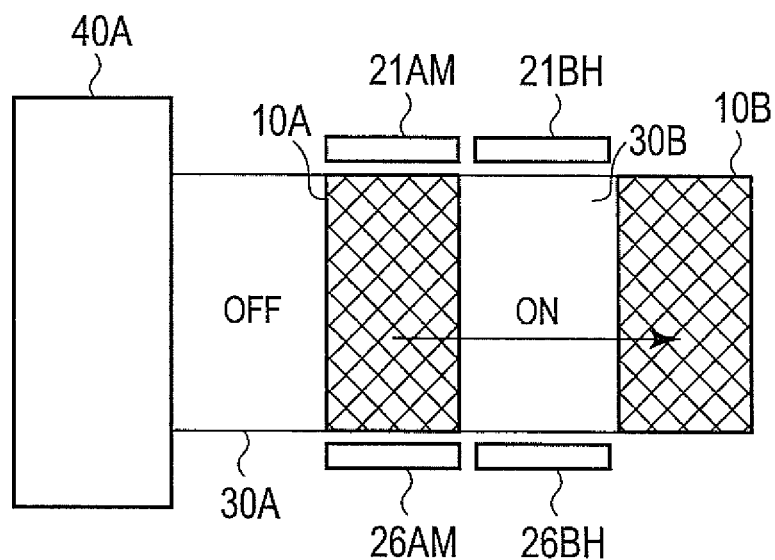
FIG. 11 is a view for explaining another example 1 of the heat switch.

FIG. 11 is a view for explaining another example 1 of the heat switches.

In the magnetic heating and cooling apparatus shown in the figure, a heat switch 30A is located between a low-temperature heat exchanger 40A and a magnetic structure 10A, and a heat switch 30B is located between the magnetic structure 10A and a magnetic structure 10B. The respective heat switches 30A and 30B have the same structure and functions. In addition, the magnetic structure 10A and the magnetic structure 10B employ any of the magnetic structures according to the respective embodiments explained above. Although not shown in the figure, the heat switches 30A and 30B described below are also provided between other magnetic structures adjacent to each other and between the magnetic structure and a high-temperature heat exchanger.

As shown in FIG. 11, the heat switches 30A and 30B are located on both surfaces of the magnetic structure 10A and opposed to each other. The heat switches 30A and 30B are integrated with the surfaces of the magnetic structure 10A by adhesion or bonding. The low-temperature heat exchanger 40A and the magnetic structure 10B are located on either side of the magnetic structure 10A. The heat switch 30A is connected or bonded to the low-temperature heat exchanger 40A and the magnetic structure 10A. The heat switch 30B is connected or bonded to the magnetic structure 10A and the magnetic structure 10B. Accordingly, the low-temperature heat exchanger 40A, the heat switch 30A, the magnetic structure 10A, the heat switch 30B and the magnetic structure 10B are integrated together.

The upper surface and the lower surface of the magnetic structure 10A are provided with a pair of permanent magnets 21AM and 26AM interposing the magnetic structure 10A therebetween. Similarly, the upper surface and the lower surface of the heat switch 30B are provided with a pair of permanent magnets 21BH and 26BH interposing the heat switch 30B therebetween. When the permanent magnets 21AM and 26AM come closer to or separate from the magnetic structure 10A, the magnetic field is applied or removed. In addition, when the permanent magnets 21BH and 26BH come closer to or separate from the heat switch 30B, the magnetic field is applied or removed.

Operation of Heat Switches

When magnetism of approximately 9 tesla is applied to the heat switches 30A and 30B, the heat conductivity increases after the application. The variation of the heat conductivity is within the range from 100 times to 3000 times. Since the heat conductivity of each of the heat switches 30A and 30B is quite low when no magnetism is applied thereto, no heat is transmitted to the low-temperature heat exchanger 40A, the magnetic structure 10A and the magnetic structure 10B connected to each other. On the other hand, the heat conductivity greatly increases once the magnetism is applied to the heat switches 30A and 30B. Accordingly, the heat is transmitted to the low-temperature heat exchanger 40A, the magnetic structure 10A and the magnetic structure 10B connected to each other.

As shown in FIG. 11, the heat switches 30A and 30B each include a transition body that causes a phase transition between an insulator and metal by application and removal of magnetism. The transition body contains at least one kind of charge ordered insulators. Once the magnetism is applied to the transition body, the phase transition to metal is caused so that the heat conductivity relatively increases. When the magnetism is removed from the transition body, the phase transition to the insulator is caused so that the heat conductivity relatively decreases.

In the case shown in FIG. 11, since no magnetism is applied to the heat switch 30A, the heat switch 30A serves as an insulator and conduction electrons hardly flow therein. As a result, no heat is transmitted between the low-temperature heat exchanger 40A and the magnetic structure 10A. On the other hand, since the magnetism is applied to the heat switch 30B due to the permanent magnets 21BH and 26BH, the heat switch 30B serves as metal and conduction electrons easily flow therein. As a result, the heat is transmitted between the magnetic structure 10A and the magnetic structure 10B. In general, phonon and conduction electrons assume solid heat conduction. In the present embodiment, flows of conduction electrons are controlled by magnetism.

Here, surveys of the mechanism of the phase transition from an insulator to metal by the application of the magnetism revealed the following findings.

In oxides of transition metal, large amounts of charge ordered insulators are present in which electrons repel each other and are localized since there are large amounts of electrons and a correlation between the electrons is strong. In the charge ordered insulators, an external field that directly acts on a behavior (a degree of freedom) of electrons other than charges, such as spins or orbits of electrons, causes a phase transition from an insulator to metal. In particular, when magnetism acts on spins of the electrons, large amounts of localized electrons move like an avalanche so as to cause the phase transition from the insulator to the metal. According to the survey report, when neodymium-strontium-manganese oxide was used, the insulator had electric resistivity as high as 500 Ωm at a temperature of 10 K (−236° C.) with magnetism of 2.4 tesla; however, the electric resistivity decreased by four figures to 0.2 Ωm when the magnetism was 9 tesla. The heat switches of this example positively utilize this phenomenon to compose the magnetic heating and cooling apparatus. In the present embodiment, $Gd_{0.55}Sr_{0.45}MnO$ and $Pr_{0.5}Ca_{0.5}MnO_3$ are used as the charge ordered insulators that cause a phase transition to metal when magnetism is applied thereto.

As described above, when the heat switches include a transition body containing charge ordered insulators, the heat conductivity can be greatly changed due to the application and removal of the magnetism so as to function appropriately. When the heat switches 30A and 30B in which the heat conductivity is changed by the application and removal of the magnetism are used, the heat conduction between the magnetic structures adjacent to each other can be stopped and continued only by controlling the application and removal of the magnetism. Therefore, there is no necessity to move the heat switches so as to be inserted in or removed from between the heat exchanger and the magnetic structure and between the magnetic structures adjacent to each other. As a result, durability of the heat switches increases and reliability thereof also increases.

As described above, a reduction in size of the magnetic heating and cooling apparatus is required when installed in a vehicle, and the reduction in size requires higher frequency of the magnetic heating and cooling apparatus. In order for higher frequency to be ensured, heat is required to be transmitted between the magnetic structures at high speed (for example, approximately 0.1 second). By use of the heat switches 30A and 30B of the present embodiment, higher frequency can easily be ensured by shortening intervals of the application of the magnetism.

Another Example 2 of Heat Switch

Figure 12:
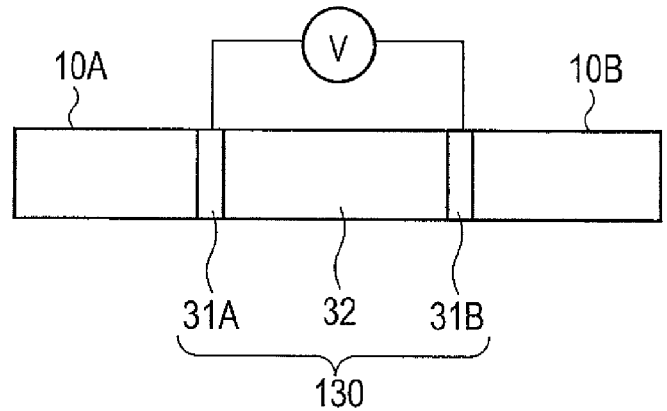
FIG. 12 is a view for explaining another example 2 of the heat switch.

FIG. 12 is a view for explaining another example 2 of the heat switch. A heat switch 130 according to this example 2 includes electrodes 31A and 31B attached to the magnetic structures 10A and 10B and a metal/insulation phase transition body 32 interposed between the electrodes 31A and 31B. One surface of the electrode 31A is attached to one surface of the magnetic structure 10A by adhesion or bonding. One surface of the electrode 31B is attached to one surface of the magnetic structure 10B by adhesion or bonding. In addition, both surfaces of the metal/insulation phase transition body 32 are attached to the other surfaces of the electrode 31A and the electrode 31B by adhesion or bonding. Thus, the magnetic structure 10A, the heat switch 130 and the magnetic structure 10B are integrated together. Although not shown in the figure, other magnetic structures and heat switches composing the heating and cooling apparatus are also integrated together by adhesion or bonding as described above. Further, the magnetic structures and the heat switches interposed between the heat exchangers are also integrated together by adhesion or bonding as described above.

The electrodes 31A and 31B include metal such as aluminum or copper having good electric conductivity. The metal used in the electrodes 31A and 31B may be a single substance or an alloy of the metals described above. Since heat is transmitted between the magnetic structures 10A and 10B via the electrodes 31A and 31B, the metal used in the electrodes 31A and 31B preferably has higher heat conductivity.

An adhesive for bonding the electrodes 31A and 31B to the magnetic structures 10A and 10B and the metal/insulation phase transition body 32, has high heat conductivity. For example, an adhesive may be used in which metal powder is mixed to the extent of not impairing adhesion, thereby improving heat conductivity.

The metal/insulation phase transition body 32 has properties of causing a phase transition from an insulator to metal when a voltage is applied to increase heat conductivity and causing a phase transition from metal to an insulator when the voltage is stopped to decrease heat conductivity. The insulator showing a phase transition between metal and an insulator may be an inorganic oxide Mott insulator or an organic Mott insulator. The inorganic oxide Mott insulator contains at least a transition metal element. Examples of known Mott insulators include $LaTiO_3$, $SrRuO_4$, and BEDT-TTF (TCNQ). Examples of known devices capable of a phase transition between metal and an insulator include a ZnO single-crystal thin film electric double layer FET and a TMTSF/TCNQ stacked FET device. Heat can be transferred by use of heat electrons and crystal lattices. The ZnO single-crystal thin film electric double layer FET and the TMTSF/TCNQ stacked FET device use characteristics of heat electrons that actively move when a voltage is applied. In this example, the metal/insulation phase transition body 32 uses an insulator in which heat conduction greatly changes by voltage application and removal, which is, for example, the inorganic oxide Mott insulator containing at least a transition metal element or the organic Mott insulator. Alternatively, the metal/insulation phase transition body 32 may also use the ZnO single-crystal thin film electric double layer FET or the TMTSF/TCNQ stacked FET device.

As shown in FIG. 12, when a DC voltage V is applied between the electrode 31A and the electrode 31B, the heat conductivity of the metal/insulation phase transition body 32 relatively increases so as to cause heat transmission between the magnetic structure 10A and the magnetic structure 10B. When the DC voltage V between the electrode 31A and the electrode 31B is removed, the heat conductivity of the metal/insulation phase transition body 32 relatively decreases so as to inhibit heat transmission between the magnetic structure 10A and the magnetic structure 10B. Therefore, the heat switch 130 functions to control the heat transmission by the voltage application and removal.

Since the stop and continuation of the heat conduction of the heat switch 130 can be controlled by the voltage application and removal, the heat can be transferred between the magnetic structures without sliding the heat switch therebetween. Accordingly, there is no need for the heat switch to have durability, thereby improving reliability of the heat switch. In addition, a mechanical loss caused by friction can be prevented, thereby decreasing a driving loss of the heat switch. Further, the heat switch can transfer the heat only in the direction along the magnetic structures so that the heat conductivity of the heat switch increases compared with a sliding-type switch, thereby decreasing a thermal loss at the time of heat transmission. Moreover, the heat switch can connect the magnetic structures by use of all contact surfaces thereof depending on the voltage application and removal so as to improve a heat transmission capacity and heat transmission efficiency.

The heat conduction of the heat switch 130 can be intermittently carried out by applying or removing the voltage to or from the electrodes 31A and 31B. The provision of the electrodes 31A and 31B can contribute to easily applying a voltage to the metal/insulation phase transition body 32. In addition, when the metal/insulation phase transition body 32 uses the inorganic oxide Mott insulator containing at least a transition metal element, the organic Mott insulator, the ZnO single-crystal thin film electric double layer FET or the TMTSF/TCNQ stacked FET device, responsiveness of variation in heat conductivity is improved.

Another Example 3 of Heat Switch

Figure 13:
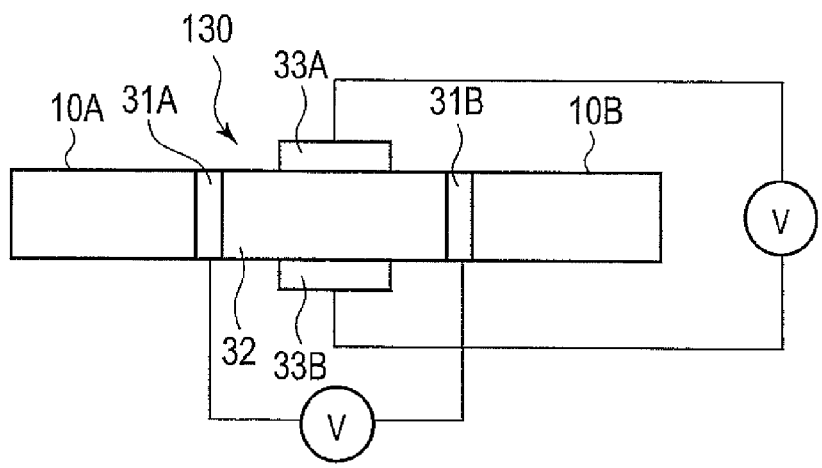
FIG. 13 is a view for explaining another example 3 of the heat switch.

FIG. 13 is a view for explaining another example 3 of the heat switch.

The heat switch 130 according to this example 3 is obtained in a manner such that auxiliary electrodes 33A and 33B are further added to the heat switch 130 explained in example 2. The other configurations and operations are the same as those in example 2.

The auxiliary electrodes 33A and 33B are attached to the metal/insulation phase transition body 32 by adhesion or bonding. The heat conductivity of the auxiliary electrodes 33A and 33B need not be considered. In addition, the heat conductivity of the adhesive used for bonding the auxiliary electrodes 33A and 33B to the metal/insulation phase transition body 32 need not be considered either. This is because heat electrons do not pass through the auxiliary electrodes 33A and 33B or the adhesive.

The auxiliary electrodes 33A and 33B apply a voltage to the electrodes 31A and 31B in the vertical direction. When a DC voltage is applied between the auxiliary electrode 33A and the auxiliary electrode 33B, the electrons in the metal/insulation phase transition body 32 are unevenly distributed towards the auxiliary electrodes 33A and 33B. As a result, the resistance of the heat electrons moving between the magnetic structure 10A and the magnetic structure 10B decreases so that the heat electrons easily move therebetween. Namely, the provision of the auxiliary electrodes 33A and 33B can contribute to further increasing the heat conductivity of the metal/insulation phase transition body 32.

Another Example 4 of Heat Switch

Figure 14:
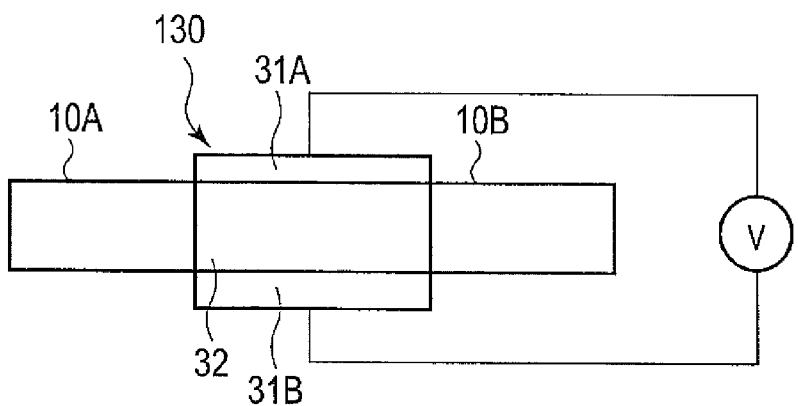
FIG. 14 is a view for explaining another example 4 of the heat switch.

FIG. 14 is a view for explaining another example 4 of the heat switch.

The heat switch 130 according to this example 4 is provided with the electrodes 31A and 31B not between the metal insulation phase transition body 32 and the magnetic structure 10A or the magnetic structure 10B but in a manner as to apply a voltage in the direction perpendicular to the moving direction of heat electrons moving in the metal/insulation phase transition body 32. The other configurations and operations are the same as those in example 2.

Therefore, the metal/insulation phase transition body 32 is directly attached to the magnetic structure 10A and the magnetic structure 10B. The metal/insulation phase transition body 32 is attached to the magnetic structure 10A and the magnetic structure 10B by adhesion or bonding. The adhesive used has high heat conductivity.

The electrodes 31A and 31B are attached to the metal/insulation phase transition body 32 by adhesion or bonding. The heat conductivity of the electrodes 31A and 31B need not be considered. In addition, the heat conductivity of the adhesive used for bonding the electrodes 31A and 31B to the metal/insulation phase transition body 32 need not be considered either. This is because heat electrons do not pass through the electrodes 31A and 31B or the adhesive.

The electrodes 31A and 31B apply a voltage in the direction perpendicular to the moving direction of the heat electrons moving in the metal/insulation phase transition body 32. When a DC voltage is applied between the electrode 31A and the electrode 31B, the electrons in the metal/insulation phase transition body 32 are unevenly distributed towards the electrodes 31A and 31B to cause a phase transition. As a result, the resistance of the heat electrons moving between the magnetic structure 10A and the magnetic structure 10B decreases so that the heat electrons easily move therebetween.

In the case of example 2 or 3, since the electrodes 31A and 31B are present in the passing direction of the heat electrons, the electrodes 31A and 31B are obstacles to the movement of the heat electrons. Therefore, the electrodes 31A and 31B function to decrease the heat conductivity. In contrast, in the case of example 4, since the metal/insulation phase transition body 32 is directly attached to the magnetic structures 10A and 10B, the electrodes 31A and 31B do not decrease the heat conductivity. Accordingly, the heat conductivity of the heat switch 130 according to example 4 increases compared with the case of example 2 or 3.

Another Example 5 of Heat Switch

Figure 15:
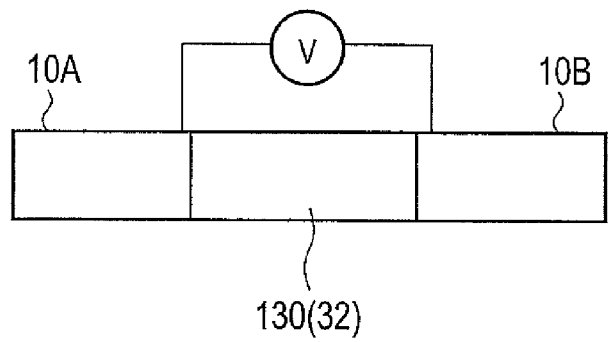
FIG. 15 is a view for explaining another example 5 of the heat switch.

FIG. 15 is a view for explaining another example 5 of the heat switch.

The heat switch 130 according to this example 5 is provided with the metal/insulation phase transition body 32 directly attached to the magnetic structures 10A and 10B in a manner as to apply a DC voltage to the magnetic structures 10A and 10B. The metal/insulation phase transition body 32 is attached to the magnetic structures 10A and 10B by adhesion or bonding. The adhesive used has high heat conductivity. The other configurations and operations are the same as those in example 2.

The use of the magnetic structures 10A and 10B serving as electrodes contributes to simplifying the structure, decreasing the number of components used and simplifying the production process. As in the case of example 4, the heat conductivity of the heat switch 130 increases compared with the case of example 2 or 3.

Another Example 6 of Heat Switch

Figure 16:
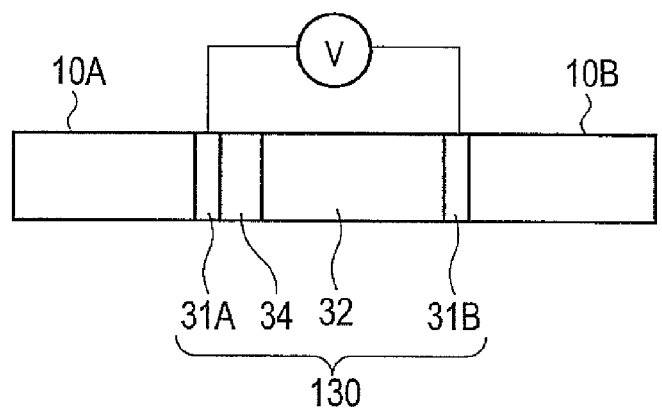
FIG. 16 is a view for explaining another example 6 of the heat switch.

FIG. 16 is a view for explaining another example 6 of the heat switch.

The heat switch 130 of this example 6 further includes an insulator 34. In particular, as shown in FIG. 16, the insulator 34 that prevents movement of heat electrons is provided between the electrode 31A and the metal/insulation phase transition body 32. Although the insulator 34 is added to the configuration of example 1 in FIG. 16, the insulator 34 may be added to any of the configurations of examples 2 to 4. The other configurations and operations are the same as those in example 2.

The insulator 34 is provided in order to prevent movement of electrons other than the heat electrons. A current flows between the electrode 31A and 31B when a DC voltage is applied between the electrode 31A and the electrode 31B. However, electrons not involved in the heat transport may excessively move in addition to the moving heat electrons. In order to prevent the excessive movement of electrons not involved in the heat transport, the insulator 34 is attached to the metal/insulation phase transition body 32 so as to prevent a reduction in heat conductivity of the metal/insulation phase transition body 32.

Another Example 7 of Heat Switch

Figure 17:
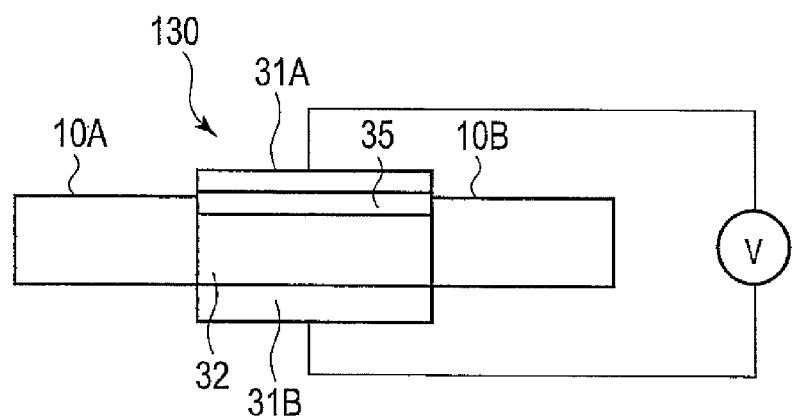
FIG. 17 is a view for explaining another example 7 of the heat switch.

FIG. 17 is a view for explaining another example 7 of the heat switch.

This example 7 has a configuration in which a polarization body 35 is added to the heat switch 130 according to example 4 shown in FIG. 14. In particular, the polarization body 35 is placed between the electrode 31A and the metal/insulation phase transition body 32 to promote the movement of the heat electrons. The polarization body 35 includes at least one of a dielectric and ionic liquid. The other configurations and operations are the same as those in example 4.

The polarization body 35 extracts electrons moving in the metal/insulation phase transition body 32 or pours electrons into the metal/insulation phase transition body 32. As a result, the distribution state of the electrons in the metal/insulation phase transition body 32 changes so that the heat electrons easily flow. The provision of the polarization body 35 can contribute to further increasing the heat conductivity of the metal/insulation phase transition body 32.

According to other examples 2 to 7 of the heat switch, when using the heat switch 130 in which the heat conductivity changes by the voltage application and removal, the heat conduction between the magnetic structures adjacent to each other can be stopped and continued only by controlling the voltage application and removal. Therefore, there is no need for the heat switch itself to move so as to be inserted in or removed from between the heat exchanger and the magnetic structure and between the magnetic structures adjacent to each other. Accordingly, durability of the heat switches increases and reliability thereof also increases.

A reduction in size of the magnetic heating and cooling apparatus is required when, for example, installed in a vehicle, and the reduction in size requires higher frequency of the magnetic heating and cooling apparatus. In order for higher frequency to be ensured, heat is required to be transmitted between the magnetic structures at high speed (for example, approximately 0.1 second). The heat switch 130 according to the present embodiment can ensure higher frequency by shortening ON/OFF intervals of the voltage.

Although the present invention has been described above by reference to the examples, the present invention is not limited to the descriptions thereof, and it will be apparent to those skilled in the art that various modifications and improvements can be made.

The magnetic structure according to the present invention is provided therein with the high heat conduction members having higher heat conductivity than the magnetocaloric materials. Therefore, all of or part of the heat produced in the magnetocaloric materials can rapidly be transmitted in the magnetic structure.

The magnetic heating and cooling apparatus according to the present invention includes the plural magnetic structures arranged therein together with the heat switches. Therefore, the application and removal of the magnetic field at higher frequency is possible due to the high heat conductivity of the magnetic structures, thereby contributing a further reduction in size of the apparatus.

The invention claimed is:
1. A magnetic structure comprising:
a magnetocaloric material that changes in temperature due to application and removal of a magnetic field; and a high heat conduction member that is in contact with the magnetocaloric material and has higher heat conductivity than the magnetocaloric material;

a high heat conduction wall in contact with each end portion of at least one of the magnetocaloric material and the high heat conduction member;

a heat insulation material covering outer surfaces of the magnetic structure other than a surface that transmits heat to another member among the outer surfaces of the magnetic structure; and a casing further covering the heat insulation material, wherein the magnetocaloric material includes a plurality of hexagonal columns, the high heat conduction member has a honeycomb structure, and hexagonal holes of the honeycomb structure are filled with the magnetocaloric material, and wherein the high heat conduction wall has a higher heat conductivity than the magnetocaloric material.

2. The magnetic structure according to claim 1, wherein the magnetic structure has a polyhedral structure.

3. A magnetic heating and cooling apparatus, comprising:
a plurality of magnetic structures according to claim 1;
a heat switch interposed between the magnetic structures to perform heat conduction and heat insulation; and
a magnetic field increasing-decreasing unit that applies or removes a magnetic field to or from each of the magnetic structures.

4. A magnetic heating and cooling apparatus, comprising:
a plurality of magnetic structures according to claim 1;
a heat switch interposed between the magnetic structures to perform heat conduction and heat insulation; and
a magnetic field increasing-decreasing unit that applies or removes a magnetic field to or from each of the magnetic structures, the magnetic field increasing-decreasing unit being positioned in a manner such that a line of magnetic force from the magnetic field increasing-decreasing unit does not pass through heat insulation materials provided in the magnetic structures.

5. A magnetic structure comprising:

a magnetocaloric material that changes in temperature due to application and removal of a magnetic field;

a high heat conduction member that is in contact with the magnetocaloric material and has higher heat conductivity than the magnetocaloric material;

a high heat conduction wall in contact with each end portion of at least one of the magnetocaloric material and the high heat conduction member; and a casing having a heat insulation property covering outer surfaces of the magnetic structure, other than a surface of the magnetic structure that transmits heat to another member among the outer surfaces of the magnetic structure, wherein the magnetocaloric material includes a plurality of hexagonal columns, the high heat conduction member has a honeycomb structure, and hexagonal holes of the honeycomb structure are filled with the magnetocaloric material, and wherein the high heat conduction wall has a higher heat conductivity than the magnetocaloric material.

* * * * *